UNITED STATES PATENT OFFICE.

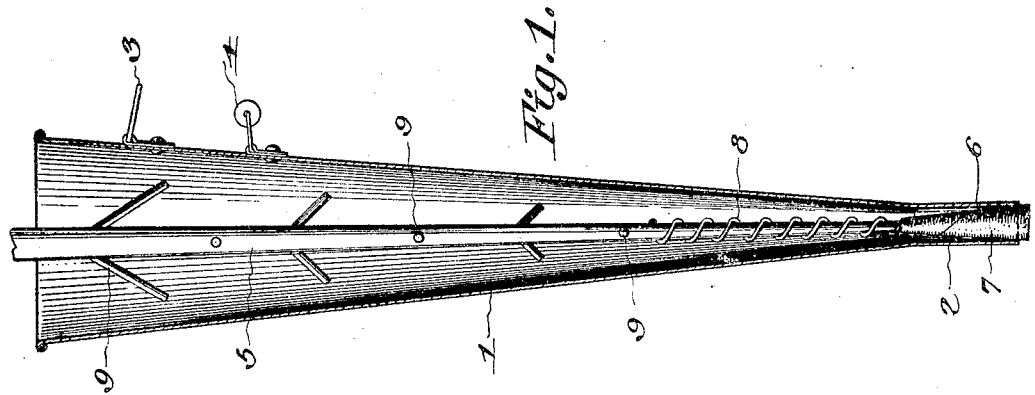
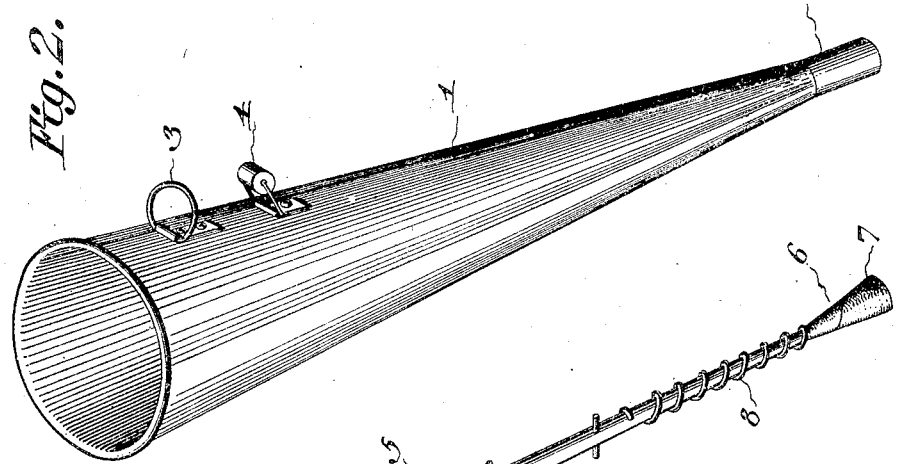
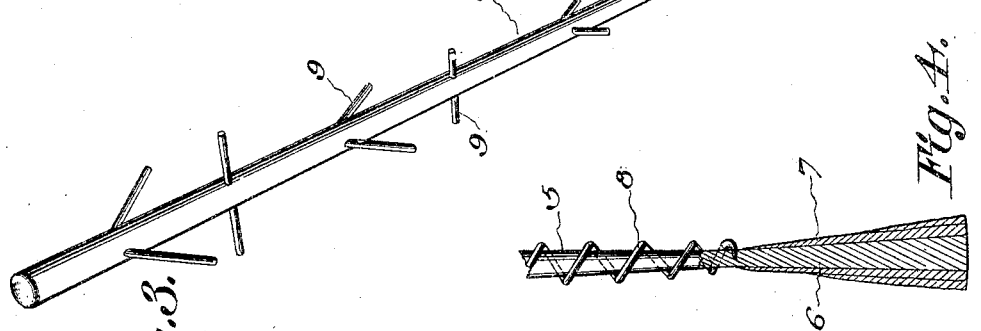

HENRY C. MELTON, OF WINNSBORO, TEXAS, ASSIGNOR OF FOUR-NINTHS TO JAMES F. TURNER, OF WINNSBORO, TEXAS, AND THREE-NINTHS TO ROBERT S. BASS, OF GREENVILLE, TEXAS.

FERTILIZER AND SEED DISTRIBUTER.

No. 808,856.     Specification of Letters Patent.     Patented Jan. 2, 1906.

Application filed May 24, 1905. Serial No. 262,030.

*To all whom it may concern:*

Be it known that I, HENRY C. MELTON, a citizen of the United States, residing at Winnsboro, in the county of Wood and State of Texas, have invented a new and useful Fertilizer and Seed Distributer, of which the following is a specification.

This invention relates to that class of fertilizer and seed distributers which are operated by hand and are carried by the operator, the object of the invention being to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that various changes, alterations, and modifications within the scope of the invention may be made without departing from the spirit or sacrificing the efficiency of the same.

In said drawings, Figure 1 is a vertical sectional view of a device constructed in accordance with the principles of the invention. Fig. 2 is a perspective view of the casing. Fig. 3 is a perspective view showing the plunger removed from the casing, and Fig. 4 is a sectional detail view of the end of the plunger having the piston.

Corresponding parts in the several figures are indicated throughout by similar characters of reference.

The casing 1 of the improved device is preferably constructed of sheet metal of elongated funnel shape terminating in a discharge-tube 2 of approximately cylindrical shape. Said casing, which may be of any desired capacity, is provided with a ring or link 3, enabling it to be supported from a belt or shoulder-strap, if desired, and it also has a handle 4, whereby it may be guided.

The plunger consists of a stick or rod 5, which may be made of wood which is preferably tapered in the direction of its lower end, where it terminates in a piston 6 of conical shape, the base constituting the extreme lower end of the plunger. The conical piston is preferably provided with an exterior covering 7, of leather or other suitable flexible material. Suitably secured to the rod 5, adjacent to the apex of the conical piston 6, is one end of a rod or wire 8, which latter is wound upon the rod 5 so as to produce a spiral flange, the upper extremity of the wire 8 being bent and driven into the rod 5 or otherwise firmly attached to the latter. Said rod is also provided with a plurality of transverse arms 9, constituting agitators.

In practice the plunger is inserted into the funnel-shaped casing, which is then filled with the material to be deposited and which may be guano or other fertilizing material or seeds, such as corn, cotton, peas, or any other small seeds which it may be desired to deposit in check-rows or in drills. The piston 6 constitutes a closure for the exit-tube while the device is being carried. When it is desired to deposit a discharge of seed or fertilizing material, the extremity of the discharge-tube is pressed into the ground, so that the soil itself will constitute a closure. The plunger is then withdrawn sufficiently to disengage the conical piston from the exit-tube, and said plunger is then rotated, thus causing the spiral flange formed by the wire 8 to force a portion of the contents of the casing past the piston and into the exit-tube. When a sufficient quantity of material has been permitted to pass into the exit-tube, the plunger is projected through the latter, thus expelling the charge and forcing it into the ground, after which the device is withdrawn, the piston remaining in position to constitute a closure until it shall be desired to repeat the operation.

While the funnel-shaped body or casing of this device has been described as being preferably constructed of sheet metal, it is desired to be understood that other material or materials may be employed in the construction thereof. Thus it would be feasible and in some instances advantageous to construct the upper portion of the casing of flexible or textile material, such portion constituting a container for the seed or fertilizing material. Again, if a flexible portion or extension is used such portion or extension may be braced and reinforced by wood or metal, or both, or the casing may be constructed of a lower metallic portion, an intermediate portion of wood, and an upper portion of textile material, all within the scope of the invention.

By means of this device seeds and fertilizing material may be readily deposited at any desired depth and in the precise spot where its presence is desired. Owing to the conical shape of the piston, the plunger may be readily withdrawn into the tube after being used to expel the charge, and owing to the funnel shape of the casing the piston will be as readily guided from the interior of the latter into the exit-tube.

Having thus described the invention, what is claimed is—

1. In a fertilizer and seed distributer, a funnel-shaped casing having a cylindrical exit-tube, in combination with a plunger comprising a rod having a conical piston.

2. In a fertilizer and seed distributer, a funnel-shaped casing having a cylindrical exit-tube, in combination with a plunger comprising a rod having a piston and provided with a spirally-disposed flange adjacent to said piston.

3. In a fertilizer and seed distributer, a funnel-shaped casing having an exit-tube and a plunger comprising a rod, a conical piston at the end of said rod, and a spiral flange upon said rod adjacent to the piston.

4. In a device of the class described, a funnel-shaped casing having an exit-tube and a plunger comprising a rod having a conical piston, a wire wound upon said rod adjacent to the piston and constituting a spiral flange, and transversely-disposed agitating members.

5. In a device of the class described, a conical casing having a cylindrical discharge-tube, a supporting-link and a handle; in combination with a plunger comprising a rod having a conical piston provided with a covering of flexible material, a spiral flange adjacent to said piston, and transverse agitating members.

In testimony that I claim the foregoing as my own I have hereto affixed my signature in the presence of two witnesses.

HENRY C. MELTON.

Witnesses:
 W. H. HILL,
 E. W. WORMEL.